United States Patent
Qu et al.

(10) Patent No.: US 11,852,290 B2
(45) Date of Patent: Dec. 26, 2023

(54) APPARATUS AND METHOD FOR ADJUSTING WIDTH OF RAIL MECHANISM

(71) Applicant: CHANGZHOU MINGSEAL ROBOT TECHNOLOGY CO., LTD., Changzhou (CN)

(72) Inventors: Dongsheng Qu, Changzhou (CN); Changfeng Li, Changzhou (CN); Fuliang Gao, Changzhou (CN); Yexin Shi, Changzhou (CN); Hu Miao, Changzhou (CN); Dianqiu Zhou, Changzhou (CN)

(73) Assignee: CHANGZHOU MINGSEAL ROBOT TECHNOLOGY CO., LTD., Jiangsu (CN)

( * ) Notice: Subject to any disclaimer, the term of this patent is extended or adjusted under 35 U.S.C. 154(b) by 8 days.

(21) Appl. No.: 17/644,251

(22) Filed: Dec. 14, 2021

(65) Prior Publication Data
US 2022/0107047 A1 Apr. 7, 2022

Related U.S. Application Data (63) Continuation of application No. PCT/CN2020/115978, filed on Sep. 17, 2020.

(30) Foreign Application Priority Data

Sep. 23, 2019 (CN) .......................... 201910899565.0
Sep. 23, 2019 (CN) .......................... 201910900345.5

(51) Int. Cl.
*F16M 11/00* (2006.01)
*F16M 7/00* (2006.01)

(52) U.S. Cl.
CPC .................................. *F16M 7/00* (2013.01)

(58) Field of Classification Search
CPC . F16M 7/00; B25J 9/1692; B25J 9/026; B25J 5/04; B25J 19/023; G05B 2219/40293; B65G 15/12
See application file for complete search history.

(56) References Cited

U.S. PATENT DOCUMENTS 3,893,646 A * 7/1975 Sloyan .................... F16M 7/00
248/657
4,133,508 A * 1/1979 Sloyan .................... F16M 7/00
248/657

(Continued)

FOREIGN PATENT DOCUMENTS

CN 1964906 5/2007
CN 102909721 2/2013
(Continued)

OTHER PUBLICATIONS

Notice of Reasons for Refusal from related Japanese Appln. No. 2021-560687, dated Dec. 6, 2022. English translation attached.

(Continued)

*Primary Examiner* — Amy J. Sterling
(74) *Attorney, Agent, or Firm* — Grossman, Tucker, Perreault & Pfleger, PLLC (57) ABSTRACT

An apparatus for adjusting a width of a rail mechanism is disclosed. The rail mechanism includes a fixed rail and a movable rail parallel with each other. The apparatus for adjusting the width includes: a base configured to be provided thereon with the fixed rail; a first guide rail provided on the base and configured to be installed with the movable rail, the movable rail being movable towards or away from the fixed rail along an axial direction of the first guide rail; a moving distance acquiring module configured to acquire a moving distance required for the movable rail to move from an initial position to a working position; and a driving assembly detachably connected with the movable rail and (Continued)

configured to drive the movable rail to move from the initial position to the working position based on the moving distance.

8 Claims, 8 Drawing Sheets

(56) References Cited

U.S. PATENT DOCUMENTS

| | | | | |
|---|---|---|---|---|
| 8,910,917 | B1* | 12/2014 | Bees | F16M 7/00 |
| | | | | 248/676 |
| 2005/0133346 | A1* | 6/2005 | Kabeshita | H05K 13/0411 |
| | | | | 198/817 |

FOREIGN PATENT DOCUMENTS

| | | |
|---|---|---|
| CN | 102990641 | 3/2013 |
| CN | 203958683 | 11/2014 |
| CN | 204800626 | 11/2015 |
| CN | 205574859 | 9/2016 |
| CN | 205762126 | 12/2016 |
| CN | 205797683 | 12/2016 |
| CN | 106871805 | 6/2017 |
| CN | 107548234 | 1/2018 |
| CN | 108104557 | 6/2018 |
| CN | 208086758 | 11/2018 |
| CN | 208326487 | 1/2019 |
| CN | 208470830 | 2/2019 |
| CN | 208577063 | 3/2019 |
| CN | 208661490 | 3/2019 |
| CN | 208661610 | 3/2019 |
| CN | 109715526 | 5/2019 |
| CN | 110174645 | 8/2019 |
| CN | 110405726 | 11/2019 |
| CN | 110549314 | 12/2019 |
| JP | 2001315942 | 11/2001 |
| JP | 2002173214 A | 6/2002 |
| JP | 2003305672 | 10/2003 |
| JP | 2004342707 A | 12/2004 |
| JP | 2007203402 | 8/2007 |
| KR | 1019980070747 B1 | 2/2005 |

OTHER PUBLICATIONS

Examination Report of the corresponding Appln. No. 202127054530, dated Apr. 27, 2022. English translation attached. 6 pages.
International Search Report from corresponding PCT Appln. No. PCT/EP2020/115978, dated Dec. 18, 2020.
First Office Action from related Chinese Appln. No. 201910899565.0, dated Sep. 3, 2020. English translation attached.
Second Office Action from related Chinese Appln. No. 201910899565.0, dated Mar. 1, 2021. English translation attached.
Third Office Action from related Chinese Appln. No. 201910899565.0, dated May 21, 2021. English translation attached.
First Office Action from related Chinese Appln. No. 201910900345.5, dated Nov. 11, 2019. English translation attached.
Request for the Submission of an Opinion from corresponding Korean Appln. No. 10-2021-7037189, dated Mar. 21, 2023. English translation attached.

* cited by examiner

APPARATUS AND METHOD FOR ADJUSTING WIDTH OF RAIL MECHANISM

CROSS REFERENCE OF RELATED APPLICATION

The present disclosure is a continuation of the International Application No. PCT/CN2020/115978 filed on Sep. 17, 2020 which claims the priority of the Chinese patent application No. 201910900345.5 which is titled as "APPARATUS FOR ADJUSTING WIDTH OF RAIL MECHANISM AND ON-LINE INTELLIGENT OPERATING ROBOT HAVING THE SAME" and filed by Changzhou Mingseal Robot Technology Co. Ltd on Sep. 23, 2019, and the priority of the Chinese patent application No. 201910899565.0 which is titled as "METHOD, APPARATUS, STORAGE MEDIUM AND ELECTRONIC DEVICE FOR ADJUSTING WIDTH OF RAIL MECHANISM" and also filed by Changzhou Mingseal Robot Technology Co., Ltd on Sep. 23, 2019, all of which are hereby incorporated by reference in its entirety.

TECHNICAL FIELD

The present disclosure relates to the field of rail technology, and more particularly, to an apparatus and method for adjusting a width of a rail mechanism.

BACKGROUND

Conventionally, a rail width adjustment is achieved by cooperation of a spline with a screw rod. For example, a traditional cabinet-type glue dispenser requires an additional width adjustment apparatus to perform the width adjustment, causing a higher cost, a more complicated structure, a larger space usage and a complex width adjusting method.

SUMMARY

The present disclosure aims to solve at least one of the technical problems in the prior art.

To this end, the present disclosure provides an apparatus for adjusting a width of a rail mechanism, which can effectively utilize the space, simplify the structure, and quickly and accurately adjust the width of the rail mechanism.

The present disclosure also provides a method for adjusting a width of a rail mechanism.

According to embodiments in one aspect of the present disclosure, an apparatus for adjusting a width of a rail mechanism including a fixed rail and a movable rail parallel with each other, may be configured to move the movable rail from an initial position to a working position. The apparatus for adjusting the width of the rail mechanism includes: a base configured to be provided thereon with the fixed rail; a first guide rail provided on the base and configured to be installed with the movable rail, the movable rail being movable in a direction facing towards or facing away from the fixed rail along an axial direction of the first guide rail; a moving distance acquiring module configured to acquire a moving distance required for the movable rail to move from the initial position to the working position; and a driving assembly detachably connected with the movable rail and configured to drive the movable rail to move from the initial position to the working position based on the moving distance.

The apparatus for adjusting the width of the rail mechanism according to the embodiments of the present disclosure, may acquire a moving distance required for the movable rail to move from the initial position to the working position by the moving distance acquiring module, and subsequently move the movable rail from the initial position to the working position by the driving assembly, enabling adjustment the width of the rail mechanism, reducing complexity for width adjustment and raising accuracy for width adjustment.

According to some embodiments of the present disclosure, the apparatus for adjusting the width of the rail mechanism may further include a locking element connected with both of the movable rail and the first guide rail and configured to lock the movable rail onto the first guide rail or release the movable rail from the first guide rail.

According to some embodiments of the present disclosure, the locking element may be a barometric normal-closed guide rail brake installed on the first guide rail.

According to some embodiments of the present disclosure, the driving assembly may include: a first movable member located above the movable rail with its axial direction parallel with the axial direction of the first guide rail; and a first cooperating part connected with the first movable member and movable along the axial direction of the first movable member, the first cooperating part being detachably connected with the movable rail when moving to the initial position.

According to some embodiments of the present disclosure, the apparatus for adjusting the width of the rail mechanism may further include a second cooperating part installed on the movable rail, the second cooperating part cooperating with the first cooperating part to drive the movable rail to move along the first guide rail.

According to some embodiments of the present disclosure, a lower end of the first cooperating part is provided with an open slot, the second cooperating part is a telescopic positioning pin, and the telescopic positioning pin is configured to, when the first cooperating part moves to the initial position, move towards the open slot to be inserted into the open slot.

According to some embodiments of the present disclosure, the driving assembly may further include a second movable member located above the movable rail and connected with the first movable member, the second movable member having an axial direction perpendicular to the axial direction of the first movable member and being movable along the axial direction of the first movable member. The moving distance acquiring module may include an image capturing member provided on the second movable member and movable along the axial direction of the second movable member and being configured to acquire positional information of the fixed rail and the movable rail.

According to some embodiments of the present disclosure, a first calibrating position is preset on the fixed rail, a second calibrating position is preset on the movable rail, and the image capturing member is movable along the axial direction of the first movable member and is configured to sequentially acquire image information of the first calibrating position and the second calibrating position.

According to embodiments in another aspect of the present disclosure, a method for adjusting a width of a rail mechanism including a fixed rail and a movable rail parallel with each other may be provided, which is configured to move the movable rail from an initial position to a working position, including the following steps:

S1, acquiring, based on a first calibrating position preset on the fixed rail, first positional information of the fixed rail;

S2, acquiring, based on a second calibrating position preset on the movable rail, second positional information of the movable rail located at the initial position;

S3, calculating, based on the first positional information and the second positional information, a distance d1 between the movable rail located at the initial position and the fixed rail;

S4, calculating a moving distance d required for the movable rail to move from the initial position to the working position based on a formula of $$d=d1-d2-d3-d4,$$

where d2 represents a distance between the first calibrating position obtained at S1 and an edge of the fixed rail, d3 represents a distance between the second calibrating position obtained at step S2 and an edge of the movable rail facing the fixed rail, and d4 represents a distance between the movable rail located at the working position and the fixed rail; and S5, driving, based on the calculated moving distance d, the movable rail to move from the initial position to the working position, in which the movable rail moves in a direction facing towards the fixed rail when d>0, the movable rail moves in a direction facing away from the fixed rail when d<0, and the movable rail keep still when d=0.

According to some embodiments of the present disclosure, when the d2 equals to the d3, d=d1−2×d2−d4.

According to some embodiments of the present disclosure, both the fixed rail and the movable rail extend along a first direction, the movable rail moves from the initial position to the working position along a second direction perpendicular to the first direction, the positional information of the first calibrating position acquired at step S1 is represented as (X1, Y1), the positional information of the second calibrating position acquired at step S2 is represented as (X2, Y2), and the distance between the movable rail located at the initial position and the fixed rail at step S3 is d1=Y2−Y1.

According to some embodiments of the present disclosure, the positional information of the fixed rail and the positional information of the movable rail are acquired by an image capturing member at step S1 and step S2 respectively.

According to some embodiments of the present disclosure, at step S1, the image capturing member moves to a position over the fixed rail and acquire image information of the first calibrating position; and at step S2, the image capturing member moves from the first calibrating position towards the second calibrating position, and acquires image information of the second calibrating position when moving to a position over the movable rail located at the initial position.

According to some embodiments of the present disclosure, at step S2, the image capturing member takes a photograph every time the image capturing member moves by a preset photographing range at intervals of a preset photographing time duration.

According to some embodiments of the present disclosure, the preset photographing range is 10 mm×10 mm, and the preset photographing time duration is 200 ms.

Additional aspects and advantages of the present disclosure will be given at least in part in the following description, or become apparent partially from the following description, or can be learned from practicing of the present disclosure.

BRIEF DESCRIPTION OF DRAWINGS

The above and/or additional aspects and advantages of the present disclosure will become clear and easy to understand from the description of embodiments below in conjunction with the accompanying drawings, in which.

REFERENCE NUMERALS

Apparatus for adjusting a width 100;
Rail mechanism 10; Fixed rail 11; Movable rail 12;
Base 20; First guide rail 30; Moving distance acquiring module 40; Image capturing member 41;
Driving assembly 50; First movable member 51; First cooperating part 52; Open slot 53;
Second movable member 54; Locking element 60; Second cooperating part 70;
On-line intelligent operating robot 200; Pedestal 210; Post 220; Supporting part 230; Mounting boss 240;
Method for adjusting a width 300; Initial position 21; Working position 22; First calibrating position 23; Second calibrating position 24;
Electronic device 400; Memory 410; Operating system 411; Application 412;
Processor 420; Network interface 430; Input device 440; Hard disk 450; Display device 460.

DETAILED DESCRIPTION

The embodiments of the present disclosure will be described in detail below with reference to examples thereof as illustrated in the accompanying drawings, throughout which same or similar elements, or elements having same or similar functions are denoted by same or similar reference numerals. The embodiments described below with reference to the drawings are illustrative only, and are intended to explain, rather than limiting, the present disclosure.

In the description of the present disclosure, it shall be understood that, terms such as "center", "crosswise", "width", "upper", "lower", "top", "bottom", "inside" and others illustrating orientational or positional relations, are all on the basis of the orientational or positional relations illustrated in the drawings for convenience of simpleness of the description of the present disclosure, do not indicate or imply that the devices or elements must have a specific orientation or must be constructed and operated in a specific orientation and thus cannot construed as limiting the present disclosure. Additionally, features defined with "first" or "second" may implicitly or explicitly include one or more such features. In the description of the present disclosure, "a plurality of" means two or more, unless otherwise specifically indicated.

In the description of the present disclosure, it shall be understood that, unless otherwise clearly specified and defined, terms such as "installation", "connection", "connected" shall be understood in a broad way, for example, may mean a fixed connection, a detachable connection, or an integral connection, may mean a mechanical or electrical connection, may mean a direct connection or indirect connection through a middle medium, or may mean communication between interiors of two parts. For a person of ordinary skill in the art, the particular meaning of such terms in the present disclosure may be understood in conjunction with particular conditions.

An apparatus 100 and a method 300 for adjusting a width of a rail mechanism 10 according to embodiments of the present disclosure will be described below with reference to the accompanying drawings.

As illustrated in FIG. 1 to FIG. 5, embodiments in a first aspect of the present disclosure may provide an apparatus 100 for adjusting a width of a rail mechanism 10. The rail mechanism 10 may include a fixed rail 11 and a movable rail 12 parallel with each other. The apparatus 100 for adjusting the width of the rail mechanism 10 is configured to move the movable rail 12 from an initial position to a working position, and may include a base 20, a first guide rail 30, a moving distance acquiring module 40 and a driving assembly 50.

In particular, the base 20 may be configured to be provided thereon with the fixed rail 11, and the first guide rail 30 may be provided on the base 20. The first guide rail 30 may be configured to be installed with the movable rail 12, and the movable rail 12 is movable in a direction facing towards or facing away from the fixed rail 11 along an axial direction of the first guide rail 30. The moving distance acquiring module 40 may be configured to acquire a moving distance required for the movable rail 12 to move from the initial position to the working position. The driving assembly 50 is detachably connected with the movable rail 12. The driving assembly 50 may be configured to drive the movable rail 12 to move from the initial position to the working position based on the moving distance.

In other words, the apparatus 100 according to the embodiment of the present disclosure may be configured to adjust a width of the rail mechanism 10. The apparatus 100 for adjusting the width of the rail mechanism 10 may include the base 20, the first guide rail 30, the moving distance acquiring module 40 and the driving assembly 50. Particularly, a delivery passage may be provided along the axial direction of the rail mechanism 10. The fixed rail 11 and the movable rail 12 parallel with each other may cooperate to define the delivery passage. The width of the delivery passage may be quickly adjusted by moving the movable rail 12 from the initial position to the working position. The fixed rail 11 and the movable rail 12 may be installed on the base 20 respectively and the movable rail 12 is movable relative to the fixed rail 11. The first guide rail 30 may be provided on the base 20, and may be perpendicular to the fixed rail 11 and to the movable rail 12 respectively. The movable rail 12 is movable along the axial direction of the first guide rail 30. When the movable rail 12 moves in a direction facing towards the fixed rail 11, the width of the rail mechanism 10 may be reduced, and when the movable rail 12 moves in a direction facing away from the fixed rail 11, the width of the rail mechanism 10 may be increased. The moving distance acquiring module 40 may acquire the moving distance required for the movable rail 12 to move from the initial position to the working position. The driving assembly 50 may receive the information on the moving distance, and drive the movable rail 12 to move from the initial position to the working position along the first guide rail 30.

Thus, the apparatus 100 for adjusting the width of the rail mechanism 10 according to the embodiment of the present disclosure, by using the base 20, the first guide rail 30, the moving distance acquiring module 40 and the driving assembly 50 in cooperation with each other, may effectively increase the adjustment speed and adjustment accuracy of width of the rail mechanism 10.

Figure 1:
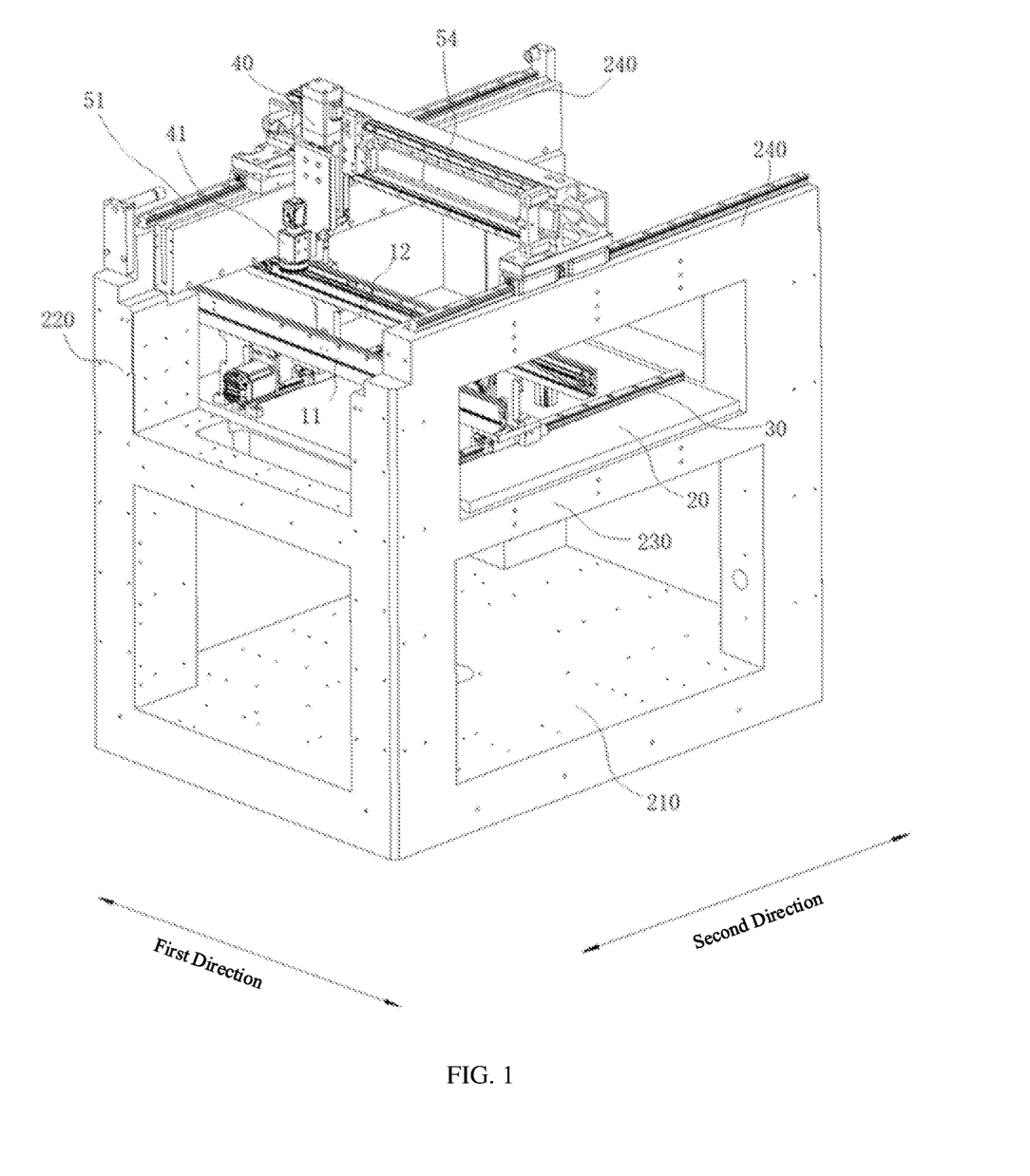
FIG. 1 is a schematic diagram illustrating a structure of an apparatus for adjusting a width of a rail mechanism according to an embodiment of the present disclosure, where a driving assembly is located at a position.

Optionally, as illustrated in FIG. 1, the driving assembly 50 may be located above the movable rail 12, which facilitates the driving assembly 50 to drive the movement of the movable rail 12.

Optionally, the first guide rail 30 and the fixed rail 11 may be perpendicular to each other, which guarantees the movable rail 12 being parallel with the fixed rail 11 when moving on the first guide rail 30.

According to an embodiment of the present disclosure, the apparatus 100 for adjusting the width of the rail mechanism 10 may further include a locking element 60. The locking element 60 may be connected with both of the movable rail 12 and the first guide rail 30. The locking element 60 may be configured to lock the movable rail 12 onto the first guide rail 30 or release the movable rail 12 from the first guide rail 30. It needs to be illustrated that, before the driving assembly 50 drives the movable rail 12 to move, the movable rail 12 may be locked onto the first guide rail 30; when the width of the rail mechanism 10 needs to be adjusted, the locking element 60 may release the movable rail 12; and after the width adjustment is completed, the movable rail 12 may be locked onto the first guide rail 30, preventing the rail mechanism 10 from swaying during delivery of a workpiece and increasing the structure stability.

Optionally, the locking element 60 may be a barometric normal-closed guide rail brake installed on the first guide rail 30. When the guide rail brake is in use, the guide rail brake may be activated with air pressure. The guide rail brake when uninflated, may press a slant block against the first guide rail 30 with a spring force to enable locking. The guide rail brake when inflated may compress the spring by air pressure to release the slant block so as to release the movable rail 12. The adoption of the guide rail brake has advantages of high convenience to use, compact in structure, maintenance-free, high reliability and being capable even without electricity and/or air pressure.

In some particular embodiments of the present disclosure, the driving assembly 50 may include a first movable member 51 and a first cooperating part 52. The first movable member 51 may be located above the movable rail 12 with its axial direction parallel with the axial direction of the first guide rail 30. The first cooperating part 52 may be connected with the first movable member 51 and is movable along the axial direction of the first movable member 51. When moving to the initial position, the first cooperating part 52 is detachably connected with the movable rail 12. When the first cooperating part 52 drives the movable rail 12 to move to the working position from the initial position, the first cooperating part 52 may be released from the movable rail 12.

Further, the apparatus 100 for adjusting the width of the rail mechanism 10 may further include a second cooperating part 70 installed on the movable rail 12. The second cooperating part 70 cooperates with the first cooperating part 52 to drive the movable rail 12 to move along the first guide rail 30. That is, when the movable rail 12 is needed to be driven, the first cooperating part 52 may move to a position over the second cooperating part 70 and cooperate with the second cooperating part 70.

Figure 2:
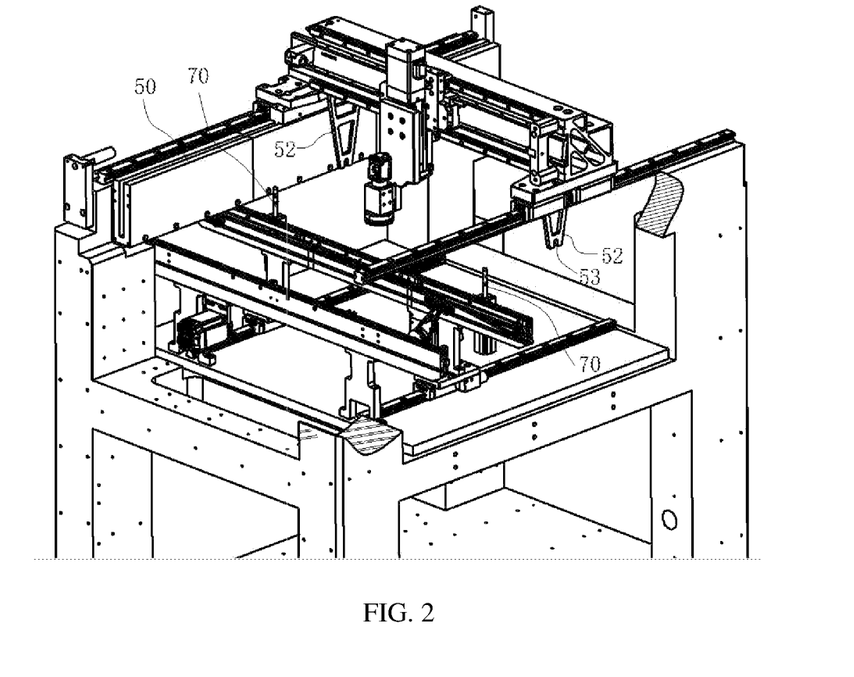
FIG. 2 is a schematic diagram illustrating a structure of an apparatus for adjusting a width of a rail mechanism according to an embodiment of the present disclosure, where a driving assembly is located at another position.
Figure 3:
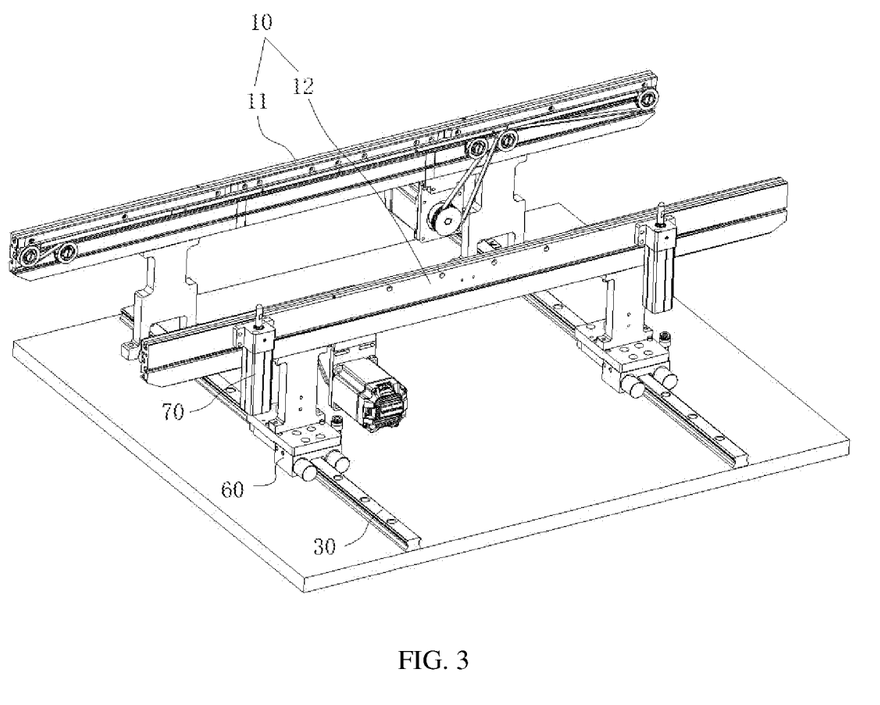
FIG. 3 is a schematic diagram illustrating an assembly of the rail mechanism and a first guide rail in an apparatus for adjusting a width of a rail mechanism according to an embodiment of the present disclosure.
Figure 4:
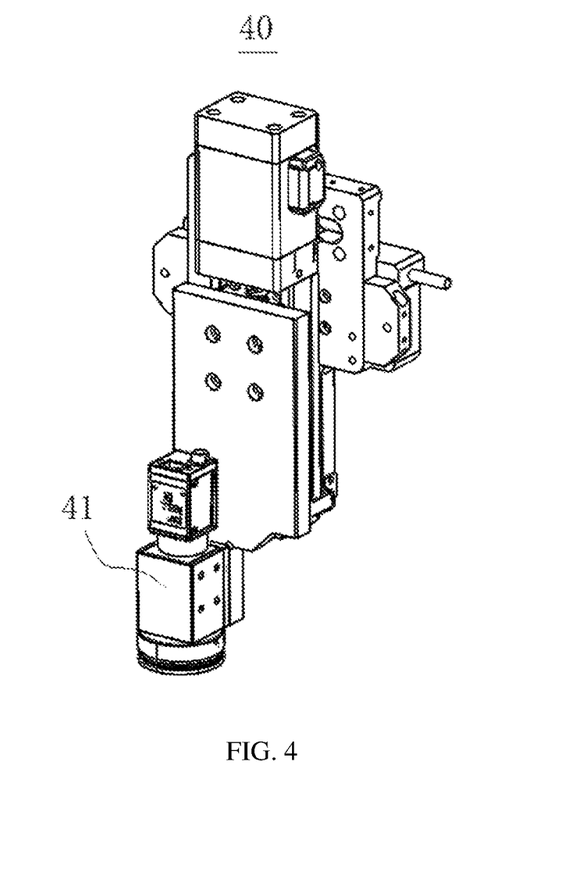
FIG. 4 is a schematic diagram illustrating a part of the structural of a moving distance acquiring module of an apparatus for adjusting a width of a rail mechanism according to an embodiment of the present disclosure.
Figure 5:
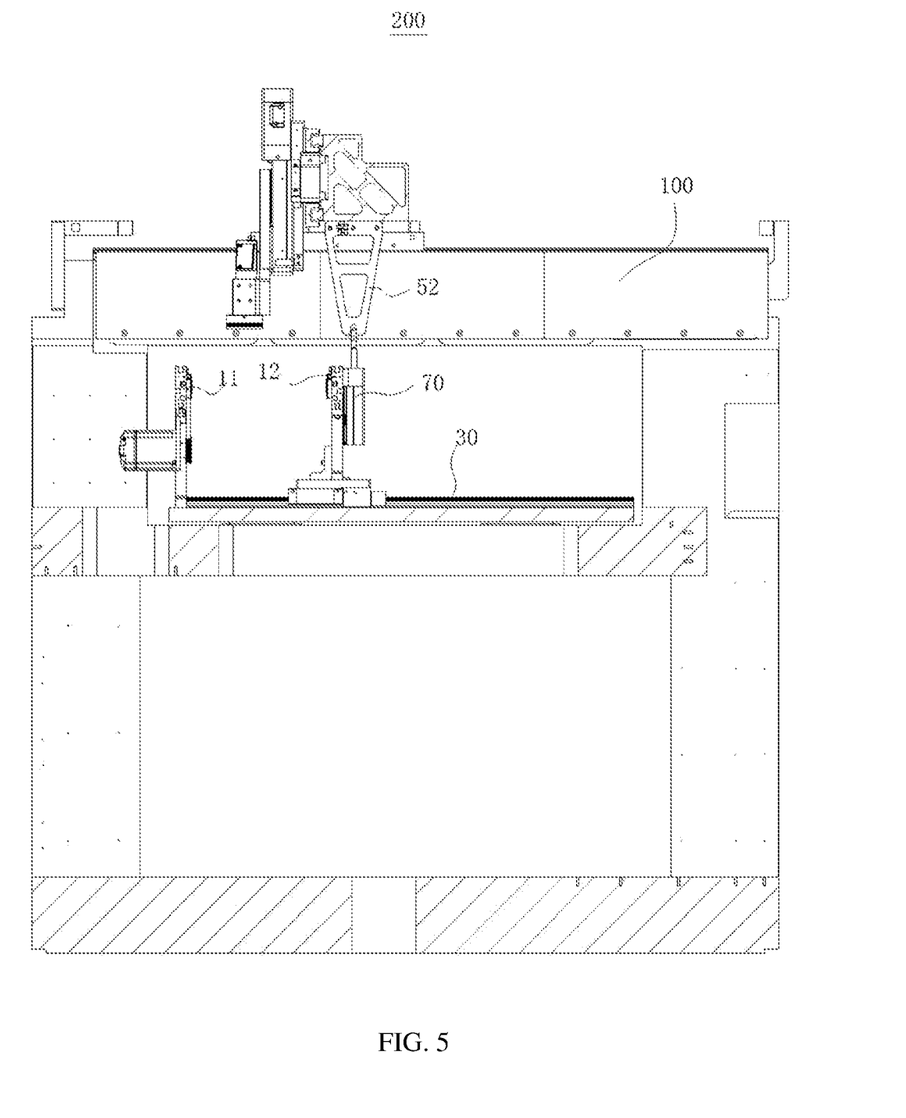
FIG. 5 is a schematic diagram illustrating cooperation of a first cooperating part with a second cooperating part in an apparatus for adjusting a width of a rail mechanism according to an embodiment of the present disclosure.

As illustrated in FIG. 1, FIG. 2 and FIG. 5, optionally, a lower end of the first cooperating part 52 may be provided with an open slot 53, and the second cooperating part 70 may be formed as a telescopic positioning pin. When the first cooperating part 52 moves to the initial position, the telescopic positioning pin may move towards the open slot 53 to be inserted into the open slot 53. The telescopic positioning pin is movable in a vertical direction. When the first cooperating part 52 moves in a direction facing towards the second cooperating part 70 and moves to a position over the second cooperating part 70, the telescopic positioning pin may move upward in the vertical direction to be inserted into the open slot 53, enabling a quick connection between the first cooperating part 52 and the second cooperating part 70. When the telescopic positioning pin moves downward in the vertical direction, the telescopic positioning pin may be released from the open slot 53, enabling a quick disconnection between the first cooperating part 52 and the second cooperating part 70.

In some particular embodiments of the present disclosure, the first cooperating part 52 may be formed as a triangle-shaped shifter fork which has advantages of high structure stability, non-deformation during long-time operation and others. The first cooperating part 52 may be provided with a lightening hole which facilitates weight reduction without compromising the structural strength.

According to an embodiment of the present disclosure, the driving assembly 50 may further include a second movable member 54. The moving distance acquiring module 40 may include an image capturing member 41. The second movable member 54 may be located above the movable rail 12 and may be connected with the first movable member 51. The second movable member 54 may have an axial direction perpendicular to the axial direction of the first movable member 51. The second movable member 54 is movable along the axial direction of the first movable member 51. The image capturing member 41 may be provided on the second movable member 54 and is movable along the axial direction of the second movable member 54 to adjust the position of the image capturing member 41 on the second movable member 54. The image capturing member 41 may include a camera and may be configured to acquire positional information of the fixed rail 11 and the movable rail 12. The second movable member 54 may extend along a first direction. The first movable member 51 may extend along a second direction. When the second movable member 54 moves along the second direction, a synchronous width adjustment can be achieved with a lower cost, efficient space utilization and a simplified structure.

It needs to be illustrated that, when at least a portion of the second movable member 54 moves along the axial direction of the first movable member 51, the image capturing member 41 may move along with the second movable member 54.

In the actual operation process, the process of adjusting the width of the rail mechanism 10 by the apparatus 100 may be generally classified into two phases as follows.

(1) Phase of Acquiring Positional Information

First, the second movable member 54 may drive the image capturing member 41 to move along the axial direction of the first movable member 51. When the image capturing member 41 moves to a position over the fixed rail 11, it can capture the positional information of the fixed rail 11. Then, the image capturing member 41 may continue moving towards the movable rail 12. When the image capturing member 41 moves to a position over the movable rail 12, it can acquire the positional information of the movable rail 12.

(2) Phase of Adjusting the Width of Rail Mechanism 10

First, after the positional information of the fixed rail 11 and the positional information of the movable rail 12 are acquired by the image capturing member 41, a moving distance required for the movable rail 12 to move from the initial position to the working position may be calculated using a formula. Then, the second movable member 54 may drive the first cooperating part 52 to move to the position where the second cooperating part 70 is located, and the first cooperating part 52 may cooperate with the second cooperating part 70. The second movable member 54 may drive the movable rail 12 to move towards the working position by the calculated moving distance through the first cooperating part 52.

Further, a first calibrating position may be preset on the fixed rail 11, and a second calibrating position may be preset on the movable rail 12. The image capturing member 41 is movable along the axial direction of the first movable member 51 and may be configured to sequentially acquire image information of the first calibrating position and the second calibrating position. The image capturing member 41 may perform photographing, which realizes functions of calibration and width adjustment.

Optionally, the positional information of the first calibrating position preset on the fixed rail 11 may be first positional information, the positional information of the second calibrating position preset on the movable rail 12 may be second positional information when the movable rail 12 is at the initial position. When the movable rail 12 is at the initial position, the distance between the movable rail 12 and the fixed rail 11 is d1 which can be obtained based on the first positional information and the second positional information. The moving distance d required for the movable rail 12 to move from the initial position to the working position satisfies the following formula (1):

$$d = d1 - d2 - d3 - d4 \qquad (1),$$

Figure 7:
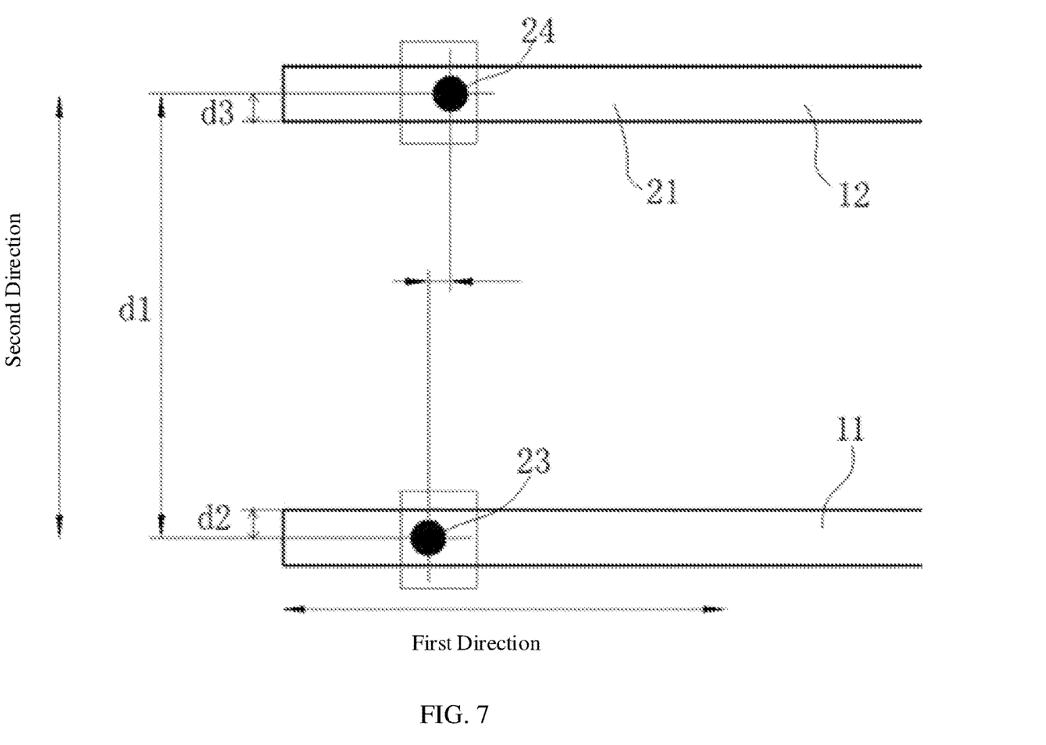
FIG. 7 is a schematic diagram illustrating a movable rail at an initial position in a method for adjusting a width of a rail mechanism according to an embodiment of the present disclosure.
Figure 8:
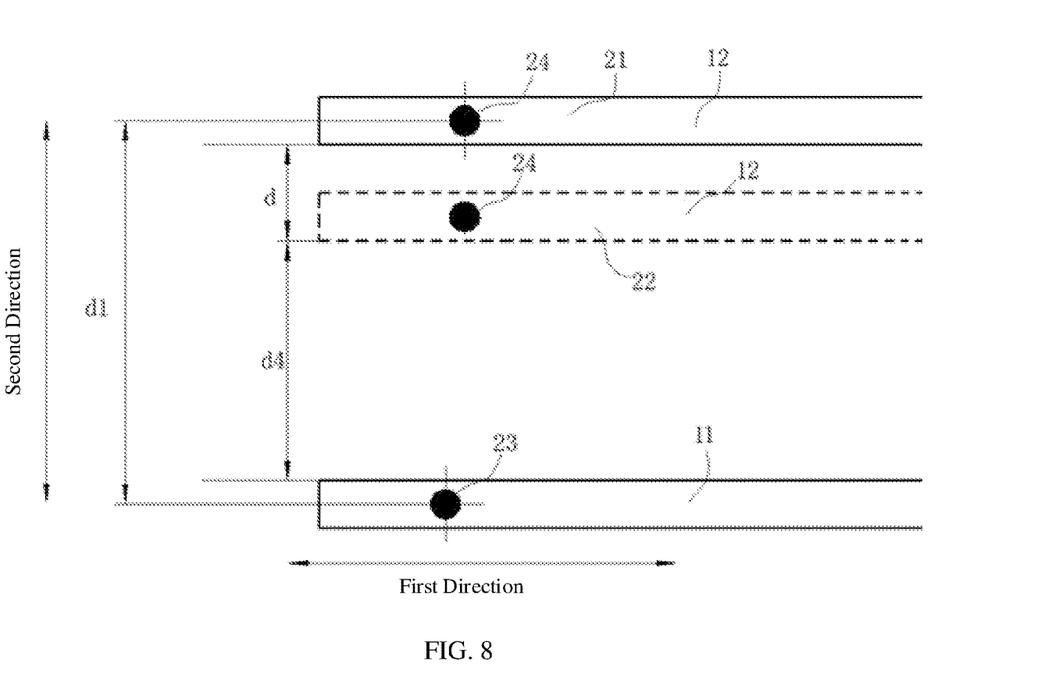
FIG. 8 is a schematic diagram illustrating a movable rail moving from an initial position to a working position in a method for adjusting a width of a rail mechanism according to an embodiment of the present disclosure.

Where, as illustrated in FIG. 7 and FIG. 8, d2 represents a distance between the first calibrating position and an edge of the fixed rail 11, d3 represents a distance between the second calibrating position and an edge of the movable rail 12 which faces the fixed rail 11, and d4 represents a distance between the movable rail 12 and the fixed rail 11 when the movable rail 12 is at the working position.

Further optionally, as illustrated in FIG. 7 and FIG. 8, a first calibrating point 23 may be preset at the first calibrating position on the fixed rail 11, a second calibrating point 24 may be preset at the second calibrating position on the movable rail 12, and the first calibrating point 23 and the second calibrating point 24 may be attached, via a mechanical processing or another way, to the surfaces of the fixed rail 11 and the movable rail 12 respectively. The shape of the first calibrating point 23 and the second calibrating point 24 may be not limited to a circle, a square, a rhombus or any other polygon. The centers of the first calibrating point 23 and the second calibrating point 24 may be fixed, and the distance d4 between the movable rail 12 and the fixed rail 11 when the movable rail 12 is at the working position 22, are fixed values, which are preset in the computer.

The driving assembly 50 may, based on the calculated moving distance d, drive the movable rail 12 to move from the initial position to the working position. Here, the movable rail 12 may move in a direction facing towards the fixed rail 11 when d>0, the movable rail 12 may move in a direction facing away from the fixed rail 11 when d<0, and the movable rail 12 may keep still when d=0.

According to an embodiment of the present disclosure, there are two first cooperating parts 52. The two first cooperating parts 52, which are spaced from each other, may be distributed at two ends in the axial direction of the second movable member 54. The second cooperating part 70 may be provided as corresponding to the first cooperating part 52, enhancing the stability of the width adjustment process.

As illustrated in FIG. 1, FIG. 2 and FIG. 5, an on-line intelligent operating robot 200 according to embodiments in a second aspect of the present disclosure includes the apparatus 100 for adjusting the width of the rail mechanism 10 according to the embodiments in the first aspect of the present disclosure. The on-line intelligent operating robot 200 may further include a pedestal 210, a plurality of posts 220, a supporting part 230 and two mounting bosses 240.

In particular, the plurality of posts 220 may be provided on the pedestal 210 and may be spaced apart from each other. The supporting part 230 may be connected with and supported by the plurality of posts 220. An upper end of each of the plurality of the posts 220 may extend upward and extend beyond the supporting part 230. The base 20 may be mounted above the supporting part 230. The two mounting bosses 240 may be spaced apart from each other and may be provided on the posts 220 oppositely with each other. An upper surface of each mounting bosses 240 may be formed as a mounting surface for mounting the driving assembly 50 as a driving mechanism.

Figure 6:
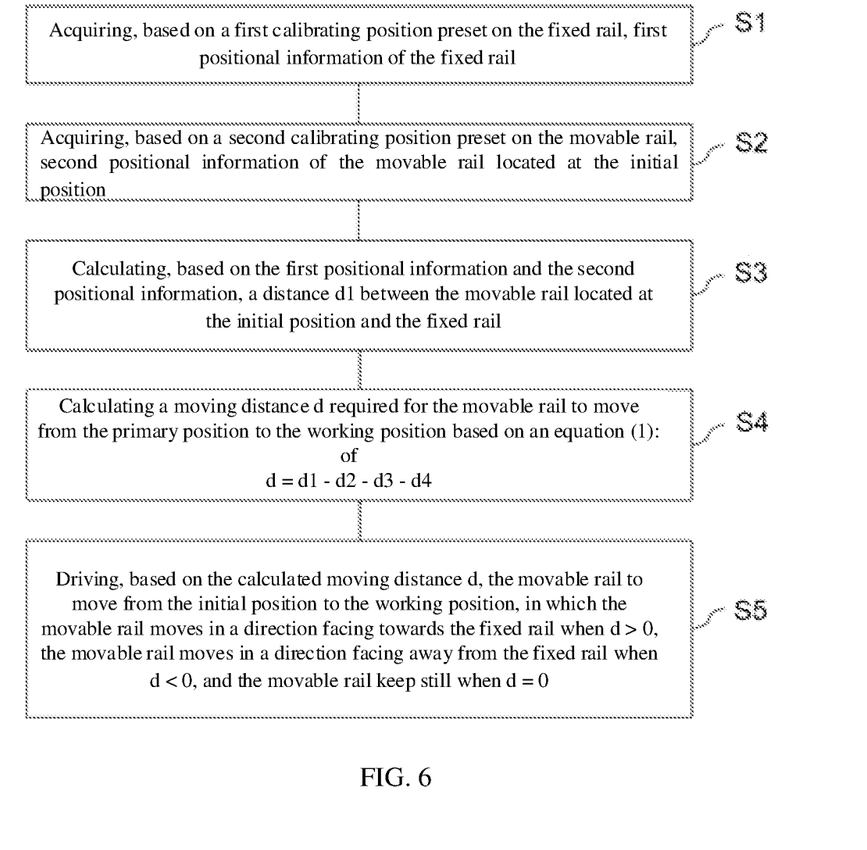
FIG. 6 is a schematic flowchart of a method for adjusting a width of a rail mechanism according to an embodiment of the present disclosure.

As illustrated in FIG. 6, the embodiments in a third aspect of the present disclosure provide a method 300 for adjusting a width of the rail mechanism 10, which may be applied in the apparatus 100 for adjusting the width of the rail mechanism 10 and the on-line intelligent operating robot 200 including the apparatus 100. Referring to FIG. 6 to FIG. 8, the method for adjusting the width of the rail mechanism 10 according to the embodiments in the third aspect of the present disclosure may move the movable rail 12 from the initial position 21 to the working position 22. As illustrated in FIG. 6, the method 300 for adjusting the width of the rail mechanism 10 may include the following steps.

At S1, first positional information of the fixed rail 11 is acquired based on a first calibrating position 23 preset on the fixed rail 11.

At S2, second positional information of the movable rail 12 located at the initial position 21 may be acquired based on a second calibrating position 24 preset on the movable rail 12.

At S3, a distance d1 between the fixed rail 11 and the movable rail 12 located at the initial position 21 may be calculated based on the first positional information and the second positional information.

At S4, a moving distance d required for the movable rail 12 to move from the initial position 21 to the working position 22 may be calculated based on the above formula (1).

At S5, the movable rail 12 may be driven to move from the initial position 21 to the working position 22 based on the calculated moving distance d, where the movable rail 12 may move in a direction facing towards the fixed rail 11 when d>0, the movable rail 12 may move in a direction facing away from the fixed rail 11 when d<0, and the movable rail 12 may keep still when d=0.

Thus, the method 300 for adjusting the width of the rail mechanism 10 according to embodiments of the present disclosure may adjust the width of the rail mechanism 10 quickly and accurately, is convenient to implement and is easy to operate.

According to an embodiment of the present disclosure, when the distance d2 between the first calibrating position and the edge of the fixed rail 11 equals to the distance d3 between the second calibrating position and the edge of the movable rail 12, $d=d1-2\times d2-d4$.

Optionally, as illustrated in FIG. 7 to FIG. 8, the fixed rail 11 may have the same width as that of the movable rail 12, the first calibrating point 23 and the second calibrating point 24 may be located in the center position of the fixed rail 11 and the movable rail 12 in the width direction respectively, which is convenient to acquire data of d2 and d3 and simplify the calculation formula and calculation process.

In some particular embodiments of the present disclosure, as illustrated in FIG. 7 and FIG. 8, both the fixed rail 11 and the movable rail 12 may extend along a first direction, the movable rail 12 may move from the initial position 21 to the working position 22 along a second direction perpendicular to the first direction. The positional information of the first calibrating position acquired at step S1 may be represented as (X1, Y1), the positional information of the second calibrating position acquired at step S2 may be represented as (X2, Y2), and the distance d1 between the movable rail 12 located at the initial position 21 and the fixed rail 11 at step S3 is $d1=Y2-Y1$. That is, in the calculating process, if there is any crosswise deviation in the first direction at the first calibrating point 23 and the second calibrating point 24, the value of the crosswise deviation will not affect the calculating process and can be automatically ignored in the calculating process.

According to an embodiment of the present disclosure, the positional information of the fixed rail 11 and the positional information of the movable rail 12 may be acquired by the image capturing member 41 at step S1 and step S2 respectively.

Optionally, at step S1, the image capturing member 41 may move to a position over the fixed rail 11 and acquire image information of the first calibrating position. At step S2, the image capturing member 41 may move from the first calibrating position in a direction facing towards the second calibrating position, and acquire image information of the second calibrating position when moving to a position over the movable rail 12 at the initial position 21.

In the actual operation, before adjusting the width, the operator may first input a desired distance d4, and then begin to manually or automatically search for the first calibrating point 23 and the second calibrating point 24.

Where, the automatic searching for the first calibrating point 23 and the second calibrating point 24 may include the follows. First, the image capturing member 41 may be moved to the first calibrating point 23 and complete photographing. Then, the image capturing member 41 is driven by the driving assembly 50 to move in a direction facing away from the fixed rail 11, until the image capturing member 41 can photograph the second calibrating point 24.

The manual searching for the first and second calibrating points may include the follows. First, the image capturing member 41 may be moved to the first calibrating point 23 and complete photographing. Then, the operator may control the image capturing member 41 to move into the photographing range of the second calibrating point 24 in a direction facing away from the fixed rail 11, and the image capturing member 41 may photograph the second calibrating point 24.

Further, at step S2, the image capturing member 41 takes a photograph every time the image capturing member 41 moves by a preset photographing range at intervals of a preset photographing time duration.

Preferably, the preset photographing range may be 10 mm×10 mm, and the preset photographing time duration may be 200 ms.

The apparatus 100 for adjusting the width of the rail mechanism 10 according to the embodiments in a fourth aspect of the present disclosure, may include a first positional information acquiring module, a second positional information acquiring module, an initial distance calculating module, a moving distance calculating module and a driving module.

In particular, the first positional information acquiring module may be configured to acquire first positional information of the fixed rail 11 based on a first calibrating position preset on the fixed rail 11, the second positional information acquiring module may be configured to acquire second positional information of the movable rail 12 when the movable rail 12 being located at the initial position based on a second calibrating position preset on the movable rail 12, the initial distance calculating module may be configured to calculate the distance d1 between the movable rail 12 and the fixed rail 11 when the movable rail 12 is located at the initial position based on first positional information and second positional information, the moving distance calculating module may be configured to calculate a moving distance d required for the movable rail 12 to move from the initial position to the working position based on the above formula (1), and the driving module may be configured to drive the movable rail 12 to move from the initial position to the working position based on the calculated moving distance d, where, the movable rail 12 may move in a direction facing towards the fixed rail 11 when d>0, the movable rail 12 may move in a direction facing away from the fixed rail 11 when d<0, and the movable rail 12 keep still when d=0.

Thus, the apparatus 100 for adjusting width of the rail mechanism 10 according to the embodiments of the present disclosure may adjust the width of the rail mechanism 10 quickly and accurately, realizing advantages of high degree of automation and high convenience in operation.

Further, a computer storage medium according to the embodiments in a fifth aspect of the present disclosure may include one or more computer program instructions which when executed, implement the method 300 for adjusting the width of the rail mechanism 10 according to the above embodiments in the third aspect of the present disclosure.

That is, the computer storage medium may stores a computer program which, when executed by a processor, enables the processor perform the method 300 for adjusting the width of the rail mechanism 10 according to the above embodiments in the third aspect of the present disclosure.

Figure 9:
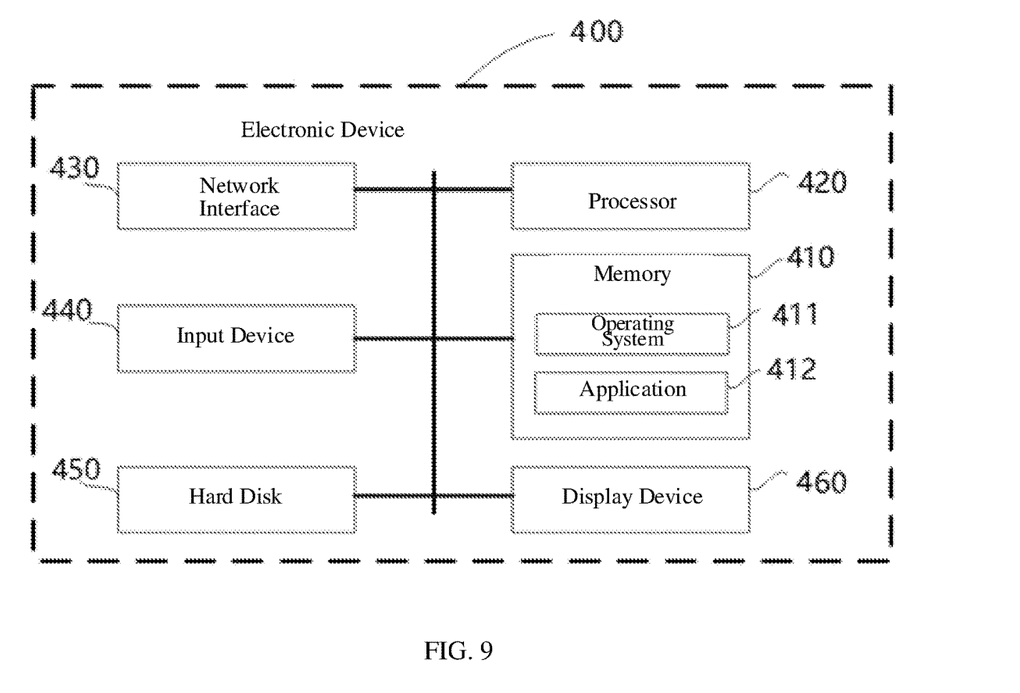
FIG. 9 is a schematic diagram illustrating an electronic device according to an embodiment of the present disclosure.

As illustrated in FIG. 9, an electronic device 400 according to the embodiments in a sixth aspect of the present disclosure may include a memory 410 and a processor 420. The memory 410 may be configured to store one or more computer program instructions. The processor 420 may be configured to invoke and execute the one or more computer program instructions to implement the method 300 according to the above embodiments in the third aspect of the present disclosure.

In other words, the electronic device 400 may include the memory 410 and the processor 420. The memory 410 stores one or more computer program instructions which, when executed by the processor 420, enable the processor 420 to perform the method 300 according to the above embodiments in the third aspect of the present disclosure.

Further, as illustrated in FIG. 9, the electronic device 400 may further include a network interface 430, an input device 440, a hard disk 450 and a display device 460.

The interface and various devices can be interconnected via a bus architecture. The bus architecture may include any number of interconnected buses and bridges. In particular, various circuits such as one or more central processor (Central Processing Unit, CPU) represented by the processor 420 and one or more memories represented by the memory 410 are connected together. The bus architecture may also connect various other circuits such as a peripheral device, a voltage stabilizer and a power management circuitry together. It may be understood that, the bus architecture is configured to realize connection and communication among these components. Apart from data bus, the bus architecture may include a power supply bus, a control bus and a status signal bus. All of these buses are known in the art and their detailed description is omitted here.

The network interface 430 may be connected to a network such as internet or Local Area Network (LAN) to acquire associated data from the network and to store the acquired associated data into the hard disk 450.

The input device 440 may be configured to receive instructions from an operator, and send the received various instructions to the processor 420 for execution by the processor 420. The input device 440 may include a keyboard or other pointing device, such as a mouse, a trackball, a touch pad or a touch panel.

The display device 460 may display the result obtained after execution of instructions by the processor 420.

The memory 410 may be configured to store program and data required for the operation of the operating system and other data such as intermediate result during the calculation executed by the processor 420.

It may be understood that, the memory 410 in the embodiments of the present disclosure may be a transitory memory, a non-transitory memory, or both. The non-transitory memory may be a read-only memory (ROM), a programmable read-only memory (PROM), an erasable programmable read-only memory (EPROM), an electric erasable programmable read-only memory (EEPROM) or a flash memory. The transitory memory may be a random access memory (RAM) used as external cache. The memory 410 in the device and method of the present disclosure is intended to include but not limited to these and any other suitable types of memories.

In some embodiments, the memory 410 may store elements such as an executable module or a data structure, or subsets or extension sets thereof, an operating system 411 and an application 412.

Here, the operating system 411 may include various system programs, for example, a frame layer, a core library layer, a driver layer, etc., so as to implement various basic tasks and process hardware-based tasks. The application 412 may include various applications such as a browser, so as to implement various application tasks. The program for implementing the method 300 for adjusting the width according to the above embodiments in the third aspect of the present disclosure may be included in the application 412.

When invoking and executing an application and data stored in the memory 410, particularly when invoking and executing programs or instructions stored in the application 412, the processor 412 may send dispersedly one of a first set and a second set to a node where the other of the first and second sets is located. The other may be stored dispersedly in at least two nodes. The processor may perform an intersection process node by node according to node distributions of the first and second sets.

The method 300 according to the above embodiments in the third aspect of the present disclosure may be applied in the processor 420 or realized by the processor 420. The processor 420 may be an integrated circuit chip capable of processing signals. In realization, the steps in the method 300 for adjusting the width may be performed by a hardware-form integrated logic circuit or software-form instructions in the processor 420. The above processor 420 may be a general processor, a digital signal processor (DSP), an application specific integrated circuit (ASIC), a field programmable gate array (FPGA) or other programmable logic device, a discrete gate or a transistor logic device, a discrete hardware component, and can realize or implement the method, step or logic flowchart in the embodiments of the present disclosure. The general processor may be a microprocessor or any other conventional processor. The steps of the method in the embodiments of the present disclosure may be directly embodied as being executed by hardware decoding processor, or a combination of a hardware module and a software module in the decoding processor. The software module may be located in a storage medium known in the art, such as a random memory, a flash memory, a read-only memory, a programmable read-only memory or an electric erasable programmable memory, a register and so on. The storage medium may be located in the memory 410. The processor 420 may read information in the memory 410 and execute steps in the method in cooperation with hardware.

It may be understood that the embodiments of the method 300 for adjusting width described in the present disclosure may be realized with hardware, software, firmware, middleware, microcode or combinations thereof. For hardware, the processor 420 may be realized in one or more application specific integrated circuits (ASICs), digital signal processors (DSPs), digital signal processing devices (DSPDs), programmable logic devices (PLDs), field programmable gate arrays (FPGAs), general processors, controllers, micro controllers, microprocessors and other electronic units for implementing the functions disclosed in the present disclosure or combinations thereof.

For software, the technical solution of the present disclosure may be realized by modules (such as processes or functions) having the functions disclosed herein. The software codes may be stored in the memory 410 and executed by the processor 420. The memory 410 may be realized in the processor 420 or outside the processor 420.

Particularly, the processor 420 may be further configured to read the above computer program to perform the method 300 according to the above embodiments in the third aspect of the present disclosure.

It shall be understood that, in the embodiments of the present disclosure, the method and apparatus may be realized in other ways. For example, the embodiments of the apparatus described above are only exemplary, e.g., the classification of units are only based on classification of logic functions, but may be classified in other ways in actual implementation, e.g., several units or components may be combined or integrated into another system, or some features may be ignored or not executed. In addition, the displayed or discussed coupling or direct coupling or communication connection may be indirect coupling or communication connection via some interfaces, devices or units, or may be an electric connection, a mechanic connection or other connection ways.

In addition, the functional units in the embodiments of the present disclosure may be integrated into one processing unit or physically separate, or two or more functional units may be integrated into one unit. The above integrated unit may be realized in hardware or combination of hardware and software functional units.

The integrated unit implemented in software functional units may be stored in a computer-readable storage medium. The above software functional units may be stored in a storage medium and may include instructions to cause a computer device (which may be a personal computer, a server or a network device) to perform part of the steps of transmitting-receiving process in the embodiments of the present disclosure. The above storage medium may include various mediums which can store program codes, such as a U-disk, removable hard disk, a read-only memory (ROM for short), a random access memory (RAM for short), a magnetic disk or an optic disk.

In the description of the present disclosure, the description with reference to the terms "one embodiment", "some embodiments", "exemplary embodiments", "example", "specific example", or "some examples", etc., means that specific features, structures, materials, or characteristics described in conjunction with the embodiment(s) or example(s) are included in at least one embodiment or example of the present disclosure. In the present disclosure, any illustrative reference of the above terms does not necessarily refer to the same embodiment(s) or example(s). In addition, specific characteristics, structures, materials or features described may be combined in a suitable manner in any one or more embodiments or examples.

Although the embodiments of the present disclosure have been shown and described above, it can be appreciated by those of ordinary skill in the art that various changes, modifications, replacements and variants can be made to the above embodiments without departing from the principle and the spirit of the present disclosure. The scope of the disclosure is defined by claims and equivalents thereof.

What is claimed is:

1. An apparatus for adjusting a width of a rail mechanism, the rail mechanism comprising a fixed rail and a movable rail parallel with each other, wherein the apparatus for adjusting the width of the rail mechanism is configured to move the movable rail from an initial position to a working position and comprises:

a base configured to be provided thereon with the fixed rail;

a first guide rail provided on the base and configured to be installed with the movable rail, the movable rail being movable in a direction facing towards or facing away from the fixed rail along an axial direction of the first guide rail;

a moving distance acquiring module configured to acquire a moving distance required for the movable rail to move from the initial position to the working position;

a driving assembly detachably connected with the movable rail and configured to drive the movable rail to move from the initial position to the working position based on the moving distance; and a locking element connected with both of the movable rail and the first guide rail and configured to lock the movable rail onto the first guide rail or release the movable rail from the first guide rail, wherein the locking element is a barometric normal-closed guide rail brake installed on the first guide rail.

2. The apparatus for adjusting the width of the rail mechanism of claim 1, wherein the driving assembly comprises:

a first movable member located above the movable rail with its axial direction parallel with the axial direction of the first guide rail; and a first cooperating part connected with the first movable member and movable along the axial direction of the first movable member, the first cooperating part being detachably connected with the movable rail when moving to the initial position.

3. The apparatus for adjusting the width of the rail mechanism of claim 2, further comprising:

a second cooperating part installed on the movable rail, the second cooperating part cooperating with the first cooperating part to drive the movable rail to move along the first guide rail.

4. The apparatus for adjusting the width of the rail mechanism of claim 3, wherein a lower end of the first cooperating part is provided with an open slot, the second cooperating part is a telescopic positioning pin, and the telescopic positioning pin is configured to, when the first cooperating part moves to the initial position, move towards the open slot to be inserted into the open slot.

5. The apparatus for adjusting the width of the rail mechanism of claim 3, wherein, the driving assembly further comprises:

a second movable member located above the movable rail and connected with the first movable member, the second movable member having an axial direction perpendicular to the axial direction of the first movable member and being movable along the axial direction of the first movable member; and the moving distance acquiring module comprises:

an image capturing member provided on the second movable member and movable along the axial direction of the second movable member, the image capturing member being configured to acquire positional information of the fixed rail and the movable rail.

6. The apparatus for adjusting the width of the rail mechanism of claim 5, wherein a first calibrating position is preset on the fixed rail, a second calibrating position is preset on the movable rail, and the image capturing member is movable along the axial direction of the first movable member and is configured to sequentially acquire image information of the first calibrating position and the second calibrating position.

7. The apparatus for adjusting the width of the rail mechanism of claim 1, wherein the first guide rail and the fixed rail are perpendicular to each other.

8. The apparatus for adjusting the width of the rail mechanism of claim 5, the number of the first cooperating parts is two, the two first cooperating parts are spaced from each other and distributed at two ends in the axial direction of the second movable member, the second cooperating part is provided as corresponding to the first cooperating part.

* * * * *